United States Patent [19]

Auchincloss

[11] Patent Number: 4,814,074
[45] Date of Patent: Mar. 21, 1989

[54] WATER NEUTRALIZER
[75] Inventor: Peter E. Auchincloss, Timonium, Md.
[73] Assignee: Hydroflo, Inc., Timonium, Md.
[21] Appl. No.: 21,346
[22] Filed: Mar. 3, 1987
[51] Int. Cl.$^4$ .............................................. C02F 1/66
[52] U.S. Cl. .................................... 210/143; 210/209; 210/259; 210/278; 210/279
[58] Field of Search ...................... 210/198.1, 206, 259, 210/279, 143, 209, 278; 422/261, 278, 279, 291

[56] References Cited
U.S. PATENT DOCUMENTS
2,304,109 12/1942 McGill ................................. 210/279

Primary Examiner—Ivars Cintins
Attorney, Agent, or Firm—Saidman, Sterne, Kessler & Goldstein

[57] ABSTRACT

An improved water neutralization apparatus is disclosed comprising an elongated vertical cylindrical tank having an upper inlet and lower outlet openings. Water distributors are assembled to the tank at its upper and lower openings. A dual-seal valve is used to automatically shift water flow from normal to backflush flow paths upon actuation of a controller, comprising a timer-operated valve in a drain line connected to the dual-stem valve. In the preferred embodiment, the neutralizing mineral is 98% pure calcium carbonate.

13 Claims, 2 Drawing Sheets

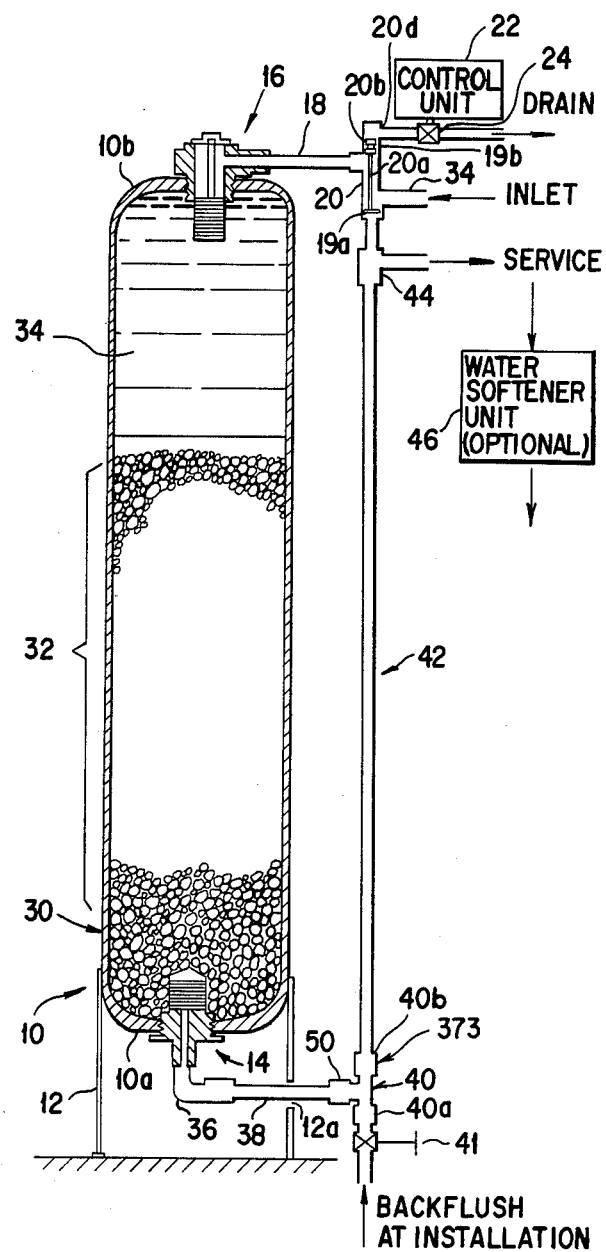

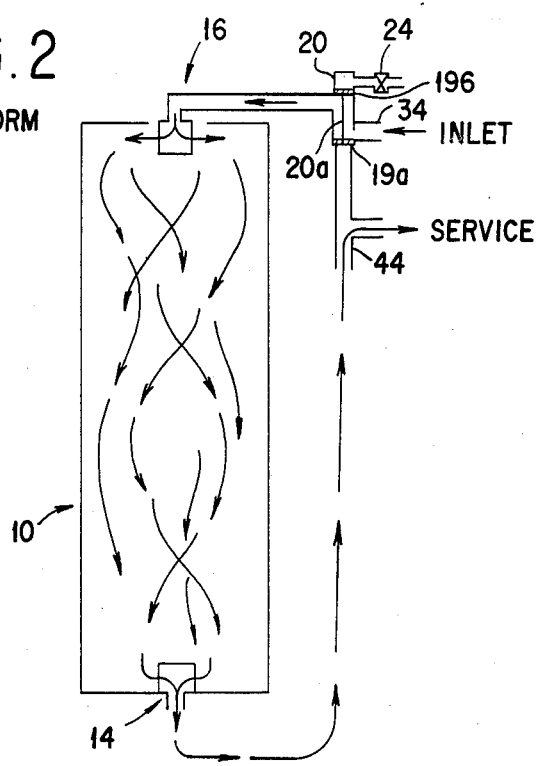
FIG.2 NORMAL FORM
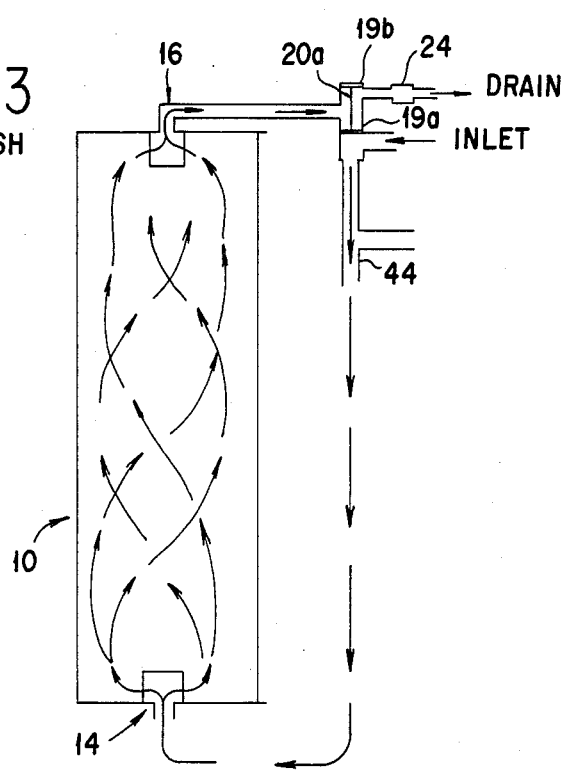
FIG.3 BACKFLUSH

WATER NEUTRALIZER

BACKGROUND OF THE INVENTION

(1) Field of the Invention

This invention relates to an improved water neutralizer for raising the pH of household drinking water.

(2) Related Art

It is well-known that excess acids in drinking water can lead to deleterious effects. Such acids can appear in a drinking water system due to a variety of sources. A common source of acids in individually drilled wells is acid leached from rotting leaves and other vegetation into the groundwater system. Typically, these sources of acid can lead to a pH in the water of between about 5.8 and about 6.5. pH levels in this range tend to lead to blue-green stains in water system elements due to reaction of the acid in the water with copper piping and solder.

One method of neutralizing such acid in water which is generally known in the art is to expose the water to a neutralizing mineral, for example calcium carbonate ($CaCO_3$), for a period of time. Typically, all water entering a dwelling is caused to reside in a tank containing a quantity of this or an equivalent mineral for a period of time. The carbonates are leached into the dwelling water supply, and neutralize the acid. The most common carbonate tanks are elongated cylindrical tanks standing in a vertical position. The neutralizing mineral is disposed in the tank. Water enters the upper end of the tank, passes downwardly through the mineral, and drains through the lower end of the tank.

A common practice is to form the tank of a fiber reinforced plastic ("fiberglass") material. Such tanks have either top-mounted or side-mounted water inlet fittings. As the typical fiberglass tank is relatively thin-walled, it is difficult to provide a seal of integrity between a sidemounted water inlet port fitting and the tank. For this reason, mounting of the water inlet fitting in the end of the tank, where the fiberglass is thicker, is preferred. Suitable fittings are commercially available. Furthermore, from time to time the carbonate supply in the tank must be replenished. This necessitates that a mineral replacement port be provided in the carbonate tank. End-mounting fittings which provide a water inlet connection and a mineral replacement port are commercially available.

It is desirable that the neutralizing mineral in the tank be backflushed at intervals to "fluff" it, that is, to ensure its continued efficiency, remove debris, etc. Automatic controllers for reversing the flow of water for backflushing the mineral for a short period of time, for example, ten minutes, at regular service intervals, for example, once per week, are known. Typically, these controllers and the associated valves are provided near the water inlet fitting. Where the water inlet fitting is affixed to the side of the tank, a leakage problem is commonly presented, as noted above. According to known methods of mounting the backflush control apparatus and associated valves at the end of the tank, complete disassembly of the control and the associated valving may be necessary in order that mineral replenishment can be performed. Since mineral replenishment typically is required at intervals of a year or less, this can present a significant inconvenience and expense to the homeowner.

Another problem of conventional neutralizers is that the neutralizing minerals commonly used are relatively inferior. One type of mineral which is commonly used comprises approximately 74% calcium carbonate, the remainder being silicates and manganese and magnesium minerals and the like. The inventor's understanding is that in typical use, such minerals require replenishment at intervals of no more than about one year. Replenishment at such an interval is inconvenient, as it requires a visit by a plumber.

Another deficiency of conventional neutralizers involves their method of assembly, and adds to their cost. It is common to employ a mixture of metal and plastic tubing and fittings. The plastic is ordinarily polyvinylchloride and the metal either copper or brass. Such mixed materials are usually sealed to one another at joints using a "Teflon" tape. (Teflon is a trademark of E. I. DuPont de Nemours and Company, Wilmington, Del.) More recently, Teflon pipe sealing compounds have become available, in which the Teflon is disposed in a thick, gluey vehicle. The sealing compound is applied to the threads of the male member of the joint using a brush.

Use of the Teflon tape can cause a problem in that a tradeoff is made between the amount of the tape used and the torque applied to the joint to obtain a leak-free connection. If one uses a large and hence relatively costly amount of tape, the joint need not be tightened extremely tight to be leakproof; if a lesser amount of tape is used, the joint must be made so tight that plastic fittings tend to rupture. Use of the tape is also relatively time-consuming and requires some little skill on the part of the installer. Brush application of the Teflon-based sealing compound is messy, time-consuming, and is also not foolproof.

Finally, certain known water neutralizers do not provide suitable means for directing water flow within the mineral bed both in normal use and upon backflush, so that the mineral bed is not used to its maximum advantage.

SUMMARY OF THE INVENTION

The invention is an improved water neutralizer which comprises an elongated vertical cylindrical tank having fittings in its upper and lower ends. A quantity of a neutralizing mineral is disposed in a bed in the tank. Water enters the tank by means of an inlet distributor assembly comprising a housing having a water inlet port and a mineral replenishment port. In normal use the mineral replenishment port is plugged. A water distributor assembly is provided to ensure that water is distributed evenly over the mineral bed in the tank. An outlet distributor assembly is mounted in the lower end of the tank, and comprises a screen for resisting passage of the neutralizing mineral out of the tank. A quantity of gravel is disposed in the bottom of the tank. A dual-seal valve, in which the two seals of the valve are connected by a single valve stem for simultaneous actuation, is provided to control flow of the water between the normal flow pattern and a backflush flow pattern. The dual-seal valve is operated by a controller which controls the opening of a control valve in a drain line. When the control valve in the drain line is opened, the two seals of the valve move simultaneously, converting the water flow pattern from normal to backflush. When the control valve in the drain line closes, that is, after expiration of a period of time sufficient for adequate backflush, the dual seal valve reconverts the water flow path to the normal pattern.

In the preferred embodiment, the neutralizing mineral used is 98% calcium carbonate, which is much more efficient and longer lived than the 74% calcium carbonate material used in most known devices. Preferably the mineral is of larger particle size and is denser than that typically used. A further improvement is made by automatic dispensing of a fixed quantity of the Teflon joint sealing compound onto the threads of mating pipe fittings during assembly of the unit, whereby its assembly is more efficient and economical while being substantially leak-proof in service.

BRIEF DESCRIPTION OF THE DRAWINGS

The invention will be better understood if reference is made to the accompanying drawings, in which:

FIG. 1 shows a cross-sectional view of the water neutralizer assembly according to the invention;

FIG. 2 shows schematically the movement of water through the neutralizer assembly of the invention in a normal flow mode;

FIG. 3 shows a corresponding view of water flow through the neutralizer assembly of the invention in the backflush mode of operation;

DESCRIPTION OF THE PREFERRED EMBODIMENTS

Figure 4:
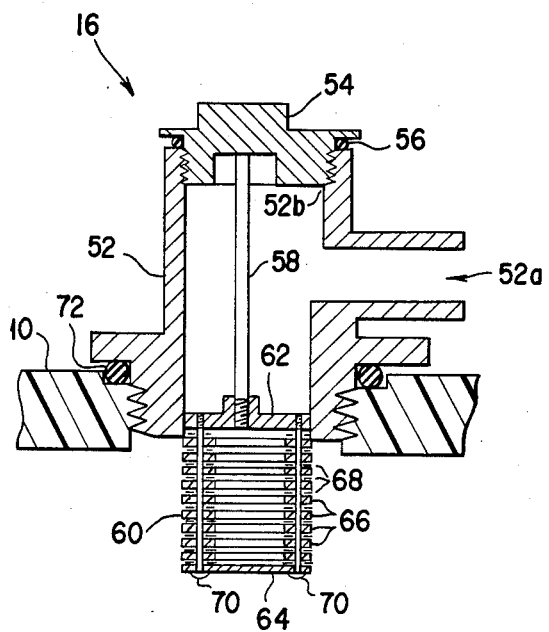
FIG. 4 shows a detailed cross-sectional view of the upper water distributor of the neutralizer assembly of the invention.

In the preferred embodiment of the neutralizer of the invention, it comprises a fiber-reinforced plastic (fiberglass) tank 10 which is generally cylindrical, and which extends vertically from a support member 12 mounted to its lower end 10a to an upper end 10b. A lower water distributor assembly 14 fits into an orifice in the lower end 10a of the tank. A corresponding upper water distributor assembly 16 fits into an orifice at the upper end 10b of the tank. No other connections are made to the tank 10. In this way, the leakage problems inherent in side-mounting of distributors or other fittings into fiberglass tanks are avoided.

As shown, the upper water distributor 16 is connected by an ordinary pipe nipple 18 to a flow controlling valve unit 20. Valve unit 20 may be a dual-seal valve such as the Aquamatic No. 662-A, available from Aqua-matic, Inc., of Rockford, Ill. This valve, as shown in Aqua-matic literature "Sheet 559-b," dated 5-16-62, incorporated herein by reference, comprises a housing member in which slide two seals 19a and 19b connected by a shaft. The two seals 19a and 19b move together upon variation of hydraulic characteristics in a drain line also connected to the valve. When this occurs, the normal service water flow pattern is altered to a backflush flow pattern. These matters are discussed in detail below and in connection with FIGS. 2 and 3.

The dual-seal valve 20 is controlled by a control unit 22 which operates a control valve 24 in a drain line connected to the valve 20. In the preferred embodiment, the control unit 22 and valve 24 may each be comprised by a "300 series" programming control valve sold by Autotrol Corporation of Milwaukee, Wis., and described in Autotrol documents R202 dated 6-84 and R210 dated 4-82, both incorporated herein by reference. The Autotrol unit 22 comprises a timer which can be set to open the control valve 24 for a predetermined period of time, for example, ten minutes, at predetermined intervals, for example, once per week. At these times the neutralizing mineral is automatically backflushed to ensure its continued efficacy.

As shown schematically in FIG. 1, in use the mineral tank 10 preferably has in it a lowest layer 30 which may be of gravel material, for example, that referred to generally as "No. 20 red flint gravel." An amount 30 of this gravel sufficient to cover the lower distributor assembly 14 may typically be provided with the unit at time of shipment. Upon installation of the neutralizer according to the invention, a quantity 32 of the neutralizing mineral is added to the tank. In the preferred embodiment, this neutralizing mineral is 98% calcium carbonate particles of sizes generally greater than 20 mesh, that is, 0.145 mm mesh. This material is available from Hydroflo, Inc., Timonium, Md., assignee of the present application, as "Hydroflo Calcite." Typically about 1.5 cubic feet of this material is employed; this amount weighs about 165–170 pounds. In the preferred embodiment, the tank 10 employed is a Model 1054 fiberglass tank from Structural Fibers Division of ESSEF Corporation of Chardon, Ohio. The internal volume of this tank is sufficient that a freeboard 34 of approximately 18 inches remains in the tank when the neutralizing mineral 32 and gravel 30 as described above have settled in use. This amount of freeboard is sufficient to ensure proper distribution of water during use.

In normal use, the water flow pattern extends from an inlet port 34 of valve 20, around the valve stem 20a, through the nipple 18 and into the upper water distributor assembly 16, which is detailed in connection with FIG. 4. In normal use, the freeboard space 34 is full of water. When water is withdrawn, water in the freeboard space 34 flows downwardly through the neutralizing mineral 32 and the gravel 30. Water then flows out through the lower water distributor 14, through an ell 36, a nipple 38, a tee fitting 40, and a length of pipe 42. The neutralized water then flows into a service tee fitting 44 and out to household service as indicated.

Use of the neutralizing mineral typically will add some "hardness," that is, dissolved minerals, to the water, so that in many cases it will be desirable to then treat the water in a water softener unit prior to actual use, as indicated generally at 46.

FIGS. 2 and 3 show water flow in the normal mode, that is, in use, and in the backflush mode, respectively. As shown in FIG. 2, normal flow is from an inlet port 34, through the valve 20 and into the upper diverter 16. Water then flows generally downwardly through the tank, that is, through the neutralizing mineral 32 and the gravel 30, out through the lower distributor assembly 14, and to service, as indicated.

In the backflush mode shown in FIG. 3, the valve 20 changes position such that water flow from the inlet is instead downwardly, past the service connection and upwardly through the lower distributor 14. The lower distributor 44 serves to spread water flow out into the gravel and through the neutralizing mineral such that the mineral tends to be "fluffed up," that is, lifted from any position into which it may have settled, such that new mineral surfaces are caused to be presented to the subsequently downwardly flowing water. Water then passes out through the upper distributor 16, around the valve stem 20a and out through a drain line. The control valve 24 is depicted with an X in it in FIG. 2, to indicate that it is closed during normal flow, and without the X in FIG. 3, to show that it is open for backflow. As discussed above, control valve 24 is operated by controller unit 22.

As described in the Aqua-matic document incorporated by reference above, and as shown in FIG. 1, the dual-seal valve 20 comprises a housing 20c receiving a control element, in this case a bobber 20b, carried by the valve stem 20a. Housing 20c defines a drain port 20d connected to controller 22, as well as ports for the other connections shown in FIG. 1. In ordinary use (FIG. 2), the bobber 20b, the valve stem 20a and the two seals 19a and 19b are in a down position. When control valve 24 is opened, water flows past the upper seal 19b. This alteration of the fluid flow pattern causes the bobber 20b and hence the seals 19a and 19b to move upwardly into the backflush position shown in FIG. 3. In this case the normal water flow path from the inlet around the valve stem and into the upper distributor 16 ceases. Instead water flows downwardly past the service connection at service tee 44 and upwardly through the lower distributor 14. Backflushing in this manner "fluffs up" the gravel and the neutralizing mineral, ensuring that the mineral is fully used for its intended purpose. Water exiting the tank 10 via the upper diverter during backflow is passed to a drain by way of a line connected to the control valve 24.

FIG. 1 shows that a tee fitting 40 connects nipple 38 to pipe 42, thus connecting the lower distributor assembly 14 to the service connection via service tee 44. The lower leg 40a of tee 40 may be employed for a drain connection, being plugged in ordinary use, or may have an additional valve 41 connected to it. Valve 41 may be used to connect the household water supply to the system for backflush during installation by way of a hose or the like. Otherwise, a normal backflush operation may be carried out upon installation. In either case, during this initial backflush process, water passes through the lower distributor 14, up through the tank 10, and out the drain connection. This has the effect of removing any fines or other undesirable material from the neutralizing mineral in bed 32.

The tee fitting 40 may in a preferred embodiment be the Model 373 "distributor elbow" available from the Clack Corporation of Windsor, Wis. This fitting 40 is configured for convenient connection of either a plug or a valve 41 and for connection to the nipple 38 by way of a coupling 50. The Model 373 fitting also contains a compression fitting at its upper end 40b, which enables convenient use of a section of copper or brass tubing as pipe 42 without the necessity of soldering, threading, or other complex assembly techniques.

FIG. 4 shows a cross-sectional view of the upper water distributor assembly 16. In the preferred embodiment, this may be a Model 498 distributor assembly available from the Clack Corporation. The distributor assembly 16 comprises a housing 52, which is provided with a threaded water inlet port 52a for mating with the nipple 18. The housing 52 is also formed to comprise a mineral replenishment port 52b, which is adapted to receive a plug 54 and be sealed thereto by an O-ring 56. Plug 54 may be threaded to receive a stem 58 which carries a distributor screen assembly 60. Screen assembly 60 comprises a threaded fitting 62 into which stem 58 is threaded, a cap 64 and a plurality of distributor disks 66, which may be separated by spacers 68. Spacers 68 are preferably molded integrally with distributor disks 66. The screen assembly 60 is held together by a plurality of screws 70 threaded into the fitting 62.

As shown in FIG. 4, the distributor assembly 16 is sealed to the tank 10 by means of a further O-ring 72 which provides a convenient and leak-proof assembly.

Use of the distributor assembly 16 shown in FIG. 4 has several advantages. Chief among these is that simply by unscrewing and removing the plug 54, the water distributor screen assembly 60 is simultaneously removed by way of the stem 58. This permits ready replenishment of the neutralizing mineral 32 as needed. In the inventor's experience, when the 98% calcium carbonate material described above is used, replenishment is required at intervals of approximately two years under ordinary circumstances. At the same time, location of the control unit 22, control valve 24 and dualseal valve 20 to one side of the tank 10, as shown in FIG. 1, simplifies the replenishment procedure, while allowing use of the top-mounted fitting, preventing leakage. By comparison, disposition of the control unit directly above the tank 10 would necessitate its complete removal for mineral replenishment or other service.

Figure 5:
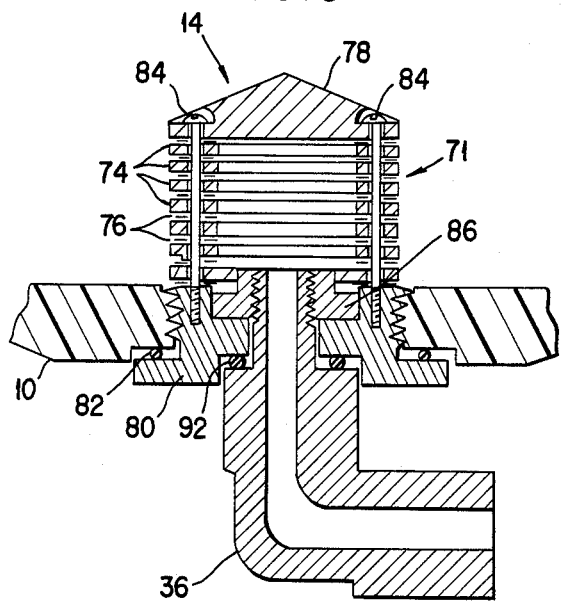
FIG. 5 shows a detailed cross-sectional view of the lower water distributor of the water neutralizer assembly of the invention.

FIG. 5 shows a cross-sectional view of the lower water distributor assembly 14. In the preferred embodiment, the lower distributor assembly 14 is a Clack Corporation model 211KSPPE distributor. As in the case of the upper distributor 16 in FIG. 4, the lower distributor 14 comprises a screen assembly 71 made up of a stack of distributor disks 74 spaced by spacers 76, which may be integrally molded with the disks 74. The disks 74 and a cap 78 are assembled to a threaded fitting 80, which is threaded into the tank 10 and sealed thereto by an O-ring 82. A number of screws 84 threaded into the threaded fitting 80 hold screen assembly 71 together. A further fitting 86 is received in a recess in the threaded member 80 and is internally threaded to receive a standard pipe-threaded ell 36. Ell 36 is sealed to fitting 80 by way of an O-ring 92. Ell 36 provides a connection between the lower water distributor assembly 14, nipple 38, tee fitting 40, piping 42 connected to further tee fitting 44.

The use of the O-rings 72 and 82, to seal the upper and lower distributor assemblies 16 and 14 respectively to the tank 10, and the use of O-rings 92 to seal ell 36 to fitting 80 provides an advantage in that this simplifies parallel alignment of the members receiving nipples 18 and 38, that is, of inlet port 52a and ell 36. Such O-ring sealed assemblies are somewhat less critical concerning the amount of torque which must be exerted to effect a good seal than are joints sealed only by sealing compounds or Teflon tape, which must be tightened at least to a minimum torque. Use of the O-rings 72 and 92 allows use of an assembly sequence as follows. The O-rings are lubricated with a non-petroleum based lubricant. The inlet distributor assembly 16 is threaded into the tank 10 and tightened. A hole 12a aligned with the water inlet port 52a in the inlet distributor assembly (FIG. 4) is drilled in base 12. The lower water distributor assembly 14 is threaded into the base of the tank 10 and tightened until the ell 36 is aligned with the hole 12a. (Alternatively, the lower distributor assembly 14 can be assembled and hole 12a drilled prior to assembly of the inlet distributor assembly 16.) By comparison, assembly of the unit of the invention using thread-sealing tapes or compounds, that is, on the threads of the distributor assemblies 14 and 16 which mate with the threads of the tank 10 and/or the threads of ell 36 mating with fitting 80 would necessitate that these assemblies be tightened with a certain minimum torque in order that secure seals could be effected. In many cases the inlet port 52a and ell 36 would not be aligned. This would necessitate more complex external piping connecting ell 36 and service tee 44.

In a preferred assembly technique, after assembly and alignment of the upper and lower water distributors as described, the nipple 38, tee 40, pipe 42, service tee 44, and dual-seal valve 20 are assembled. The entire assembly is may be placed into the tank 10 prior to shipment. Upon installation, the controller 22 and control valve 24 are added, the system is plumbed to the household inlet and service lines, an initial charge of the neutralizing mineral 32 is placed in the tank, and the system is initially backflushed as described bove.

A further improvement according to the invention involves use of a particular assembly technique. This involves application of metered amounts of a Teflon-based sealing compound to the threads of the male members assembled by threads which are not sealed by O-rings. The application is preferably made using a particular applicator machine, a model 998400 "Dial-a-Seal" applicator sold by the Loctite Corporation of Newington, Conn. The preferred sealant is Permatex "Thread Sealant with Teflon," Part 14d, also sold by Loctite. The inventor finds that use of this material, particularly when applied by this applicator, provides a reliable, economical and leak-proof joint.

While a preferred embodiment of the invention has been discussed in detail, it will be realized by those of skill in the art that numerous modifications and improvements can be made thereto without departure from spirit and scope of the invention, which is therefore not to be limited by the above exemplary embodiment, but only by the following claims.

What is claimed is:

1. Apparatus for neutralization of water of the type utilizing a quantity of neutralizing media within a tank, comprising:
   a vertical, elongated, cylindrical tank having generally hemispherical end portions, of fiber-reinforced plastic construction, and having a first opening in its upper end and a second opening in its lower end,
   an inlet distributor assembly mounted in the first upper opening in said tank, said inlet distributor assembly comprising a housing, and an inlet water distributor means, said housing being adapted to receive said inlet water distributor means for distributing water within said tank, and said housing defining a water inlet port and a media entry port through which particulate neutralizing media may be added,
   an outlet distributor assembly mounted in said second lower opening in said tank, said outlet distributor assembly comprising screen means for resisting passage of said particulate media therethrough, and defining a water outlet port,
   valving means for selectively controlling flow of water between a normal flow path, extending from said water inlet port through said inlet water distributor means, said tank, said screen means and said water outlet port and a backflush flow path extending from said water outlet port through said screen means, said tank, said inlet water distributor means and said water inlet port,
   piping means connecting said valving means to said inlet distributor assembly and to said outlet distributor assembly, and
   controller means for controlling said valving means to backflush said tank at predetermined intervals of time.

2. The apparatus of claim 1, wherein said controller means operates a control valve means which operates said valving means by altering water pressure on a control element in said valving means.

3. The apparatus of claim 2, wherein said valving means comprises seal means moving between normal and backflush positions, said seal means being connected to said control element, wherein motion of said seal means from said normal to said backflush position alters flow of inlet water from the upper opening of said tank to the lower opening, and alters flow of outlet water from the lower opening to the upper opening.

4. The apparatus of claim 3, wherein outlet water flowing from said tank during backflush passes from said tank through a drain outlet port in a housing of said valving means.

5. The apparatus of claim 4, wherein said control valve means operated by said controller means is piped to said drain port in said valving means.

6. The apparatus of claim 5, wherein when said control element is a bobber disposed in a passage in said valving means communicating with said drain port.

7. The apparatus of claim 1, further comprising a quantity of neutralizing media.

8. The apparatus of claim 7, wherein said media is calcium carbonate.

9. The apparatus of claim 8, wherein said calcium carbonate media is at least 98% pure and is particulate, the particles being generally of sizes greater than 20 mesh.

10. The apparatus of claim 9, comprising a quantity of gravel disposed about said outlet distributor assembly.

11. The apparatus of claim 1 in combination with water softener means.

12. The apparatus of claim 1, wherein the water inlet port in said upper distributor assembly and the valving means and controller means are disposed to one side of the axis of said tank, and wherein said media entry port is substantially on the axis of said tank.

13. The apparatus of claim 12, wherein said upper distributor assembly comprises a removable plug closing said media entry port, and wherein a stem joined to said plug carries said inlet water distributor assembly within the upper portion of said tank.

* * * * *